Patented June 6, 1933

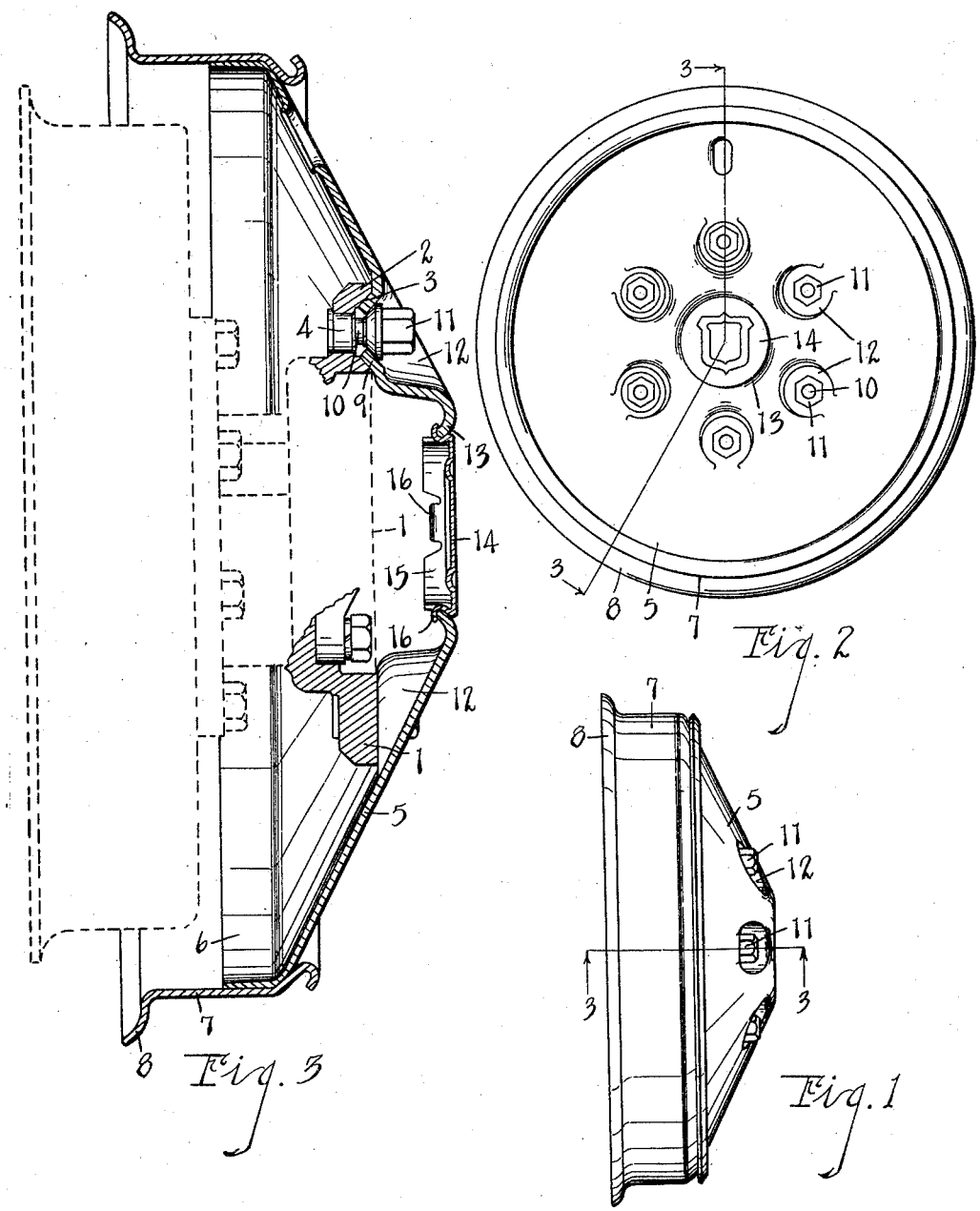

1,912,756

UNITED STATES PATENT OFFICE

JAMES L. BROWNELL, OF KALAMAZOO, MICHIGAN, ASSIGNOR TO CHECKER CAB MANUFACTURING CORPORATION, OF KALAMAZOO, MICHIGAN

VEHICLE WHEEL

Application filed July 10, 1930. Serial No. 466,981.

The main objects of this invention are:

First, to provide a vehicle wheel in which the attaching bolts and other parts likely to be injured by contact with an obstruction, such as a curb, are effectively protected by the body of the wheel.

Second, to provide a vehicle wheel which eliminates the use of a hub-cap and like projecting parts.

Third, to provide a vehicle wheel having these advantages which is attractive in appearance.

Objects pertaining to details and economies of my invention will definitely appear from the description to follow. The invention is defined in the claims.

A structure embodying the features of my invention is clearly illustrated in the accompanying drawing, in which:

Figure 1 is a plan view of my improved vehicle wheel with the rim and tire omitted.

Fig. 2 is a front elevation of the parts shown in Fig. 1.

Fig. 3 is a fragmentary section on line 3—3 of Figs. 1 and 2, the brake drum and portions of the hub being shown by dotted lines.

In the embodiment illustrated the hub 1 is provided with a peripheral flange 2 having outwardly facing conical sockets 3 therein. Nuts 4 are secured at the bottoms of these sockets.

The web element 5 is of general conical form and has a peripheral rim flange 6 to which the felly 7 is secured. This felly has a flange 8 at its inner end and is adapted to receive a demountable rim, not illustrated. This element 5 has portions struck inwardly and conformed to provide conical lugs 9 which engage the sockets 3. These conical lugs are open at the bottom to receive the bolts 10 which are threaded into the nuts 4. The heads 11 are housed within the recesses 12 resulting from striking in portions of the web member. This avoids the necessity for having the heads project from the surface of the web to any substantial extent, the heads being well within the plane of the outer end of the web member.

The web member has a central opening the edges of which have inturned curved flanges 13. The closure 14 is provided with an inturned flange 15 fitting within the flange 13 and secured therein by turning out portions 16 of the flange 15 into clamping engagement with the edge of the flange 13. The closure is thus secured to effectively close the opening and the closure may, if desired, be made of comparatively light metal. As it lies within the plane of the outer end of the web member, it is entirely guarded and protected thereby.

I have illustrated my improvements in an embodiment which I have found very practical. I have not attempted to illustrate certain other embodiments and adaptations as it is believed that this disclosure will enable those skilled in the art to embody or adapt the same as may be desired.

Having thus described my invention what I claim as new and desire to secure by Letters Patent is:

1. In a disk wheel, the combination of a hub having a peripheral flange provided with a plurality of outwardly facing conical sockets and with nuts seated at the bottoms of said sockets, a conical web having a central opening and an inturned annular curved flange at the edge of the opening, said web element having portions thereof struck inwardly and conformed to provide conical socket engaging lugs coacting with the sockets of said hub flange and outwardly facing recesses, the socket lugs having openings in the bottoms thereof, bolts disposed through said socket lugs and threaded into said nuts and having conical shoulders coacting with the walls of said lugs, the heads of the bolts being housed within the recesses, and a substantially flat closure having an inwardly projecting flange disposed within the flange of said web element, portions of the flange of said closure being turned outwardly into clamping engagement with the flange of said web element, said web and closure constituting a substantially smooth cam-like conical bumper which, upon contact with an obstruction, is readily adapted to slide past said obstruction without injury to itself or to the obstruction.

2. In a disk wheel, the combination of a hub having outwardly facing sockets and with nuts seated at the bottoms of said sockets, a conical web having a central opening and an inturned flange at the edge of the opening, said web element having portions thereof struck inwardly and conformed to provide socket engaging lugs coacting with the sockets of said hub flange and outwardly facing recesses, the socket lugs having openings in the bottoms thereof, bolts disposed through said socket lugs and threaded into said nuts, the heads of the bolts being housed within the recesses, and a substantially flat closure having an inwardly projecting flange disposed within the flange of said web element, said web and closure constituting a substantially smooth cam-like conical bumper which, upon contact with an obstruction, is readily adapted to slide past said obstruction without injury to itself or to the obstruction.

3. In a disk wheel, the combination of a hub, a conical web element mounted on said hub and having a central opening with an inturned annular curved flange at the edge of the opening, and a substantially flat closure having an inwardly projecting flange disposed within the flange of the web element, portions of the flange of said closure being turned outwardly into clamping engagement with the flange of said web element, said web and closure constituting a substantially smooth cam-like conical bumper which, upon contact with an obstruction, is readily adapted to slide past said obstruction without injury to itself or to the obstruction.

4. In a disk wheel, the combination of a hub, a conical web element mounted on said hub and having a central opening with an inturned annular flange at the edge of the opening, and a substantially flat closure having an inwardly projecting flange disposed within the flange of the web element, said web and closure constituting a substantially smooth cam-like conical bumper which, upon contact with an obstruction, is readily adapted to slide past said obstruction without injury to itself or to the obstruction.

5. In a disk wheel, the combination of a hub, a conical web element mounted on said hub and having a central opening centered in the aixs of the hub, there being an inwardly curved flange at the edge of said opening, and a substantially flat closure fitting within said flange and having integral portions engaging the inner edge of the flange, the web member constituting a guard for said closure, said web and closure constituting a substantially smooth cam-like conical bumper which, upon contact with an obstruction, is readily adapted to slide past said obstruction without injury to itself or to the obstruction.

6. In a disk wheel, the combination of a hub, a conical web element mounted on said hub and having a central opening centered in the axis of the hub, and a substantially flat closure fitting within said opening and having integral portions engaging the inner edge of the opening, the web member constituting a guard for said closure, said web and closure constituting a substantially smooth cam-like conical bumper which, upon contact with an obstruction, is readily adapted to slide past said obstruction without injury to itself or to the obstruction.

7. In a disk wheel, the combination of a hub, a conical web element mounted on said hub and having a central opening centered in the axis of the hub, there being an inwardly projecting flange at the edge of said opening, and a substantially flat closure having an inwardly projecting flange fitting within said flange of said web member, said web and closure constituting a substantially smooth cam-like conical bumper which, upon contact with an obstruction, is readily adapted to slide past said obstruction without injury to itself or to the obstruction.

8. A disk wheel comprising a conical web member having a central opening the edge of which has an inturned flange, and a substantially flat closure for said opening provided with an inturned flange fitting within said opening flange, said closure flange having out-turned portions engaging said opening flange with a clamping action, whereby to secure said closure to said web member, said closure lying in the plane of the outer end of said web member whereby it is guarded and protected thereby, the diameter of said closure being approximately equal to one-fifth of the diameter of said web member.

9. A disk wheel comprising a conical web member having a central opening the edge of which has an inturned flange, and a substantially flat closure for said opening provided with an inturned flange fitting within said opening flange, said closure flange having out-turned portions engaging said opening flange with a clamping action, whereby to secure said closure to said web member, said closure lying in the plane of the outer end of said web member, whereby it is guarded and protected thereby.

In witness whereof I have hereunto set my hand.

JAMES L. BROWNELL.